United States Patent [19]

Hiltz et al.

[11] 4,374,081
[45] Feb. 15, 1983

[54] CURE OF EPOXY SYSTEMS AT REDUCED PRESSURES

[75] Inventors: Arnold A. Hiltz, Swarthmore; Francis L. Moy, Philadelphia, both of Pa.

[73] Assignee: General Electric Co., Philadelphia, Pa.

[21] Appl. No.: 303,078

[22] Filed: Sep. 17, 1981

[51] Int. Cl.³ .......................... B29B 3/00; B29C 6/00
[52] U.S. Cl. ............................... 264/102; 264/272.13; 264/331.12; 264/DIG. 42; 264/DIG. 78; 528/111.3; 528/119
[58] Field of Search .................... 264/101, 272.13, 236, 264/347, 102, 331.12, 344, DIG. 42, DIG. 78; 528/111.3, 119

[56] References Cited

U.S. PATENT DOCUMENTS 2,803,054  8/1957  Kohring .......................... 264/101
3,608,023  9/1971  Scarborough .................... 264/101
4,289,722  9/1981  Tranburger ..................... 264/272.13

FOREIGN PATENT DOCUMENTS 637097   2/1962   Canada ........................ 264/272.13
2234973  1/1975   France ............................ 264/101
989124   4/1965   United Kingdom .......... 264/272.13
701828  10/1979   U.S.S.R. .......................... 264/101

OTHER PUBLICATIONS

"Improving Insulation Resistance of Dielectrics", Washo, *IBM Technical Disclosure Bulletin*, vol. 15, No. 3, Aug. 72.
"Improving the Strength of Plastics by Vacuum Molding", Mustafaen et al, Polym. Mech. vol. 2, No. 5, Sep.-/Oct. 1966, pp. 448-452.

*Primary Examiner*—James B. Lowe
*Attorney, Agent, or Firm*—Allen E. Amgott; Raymond H. Quist

[57] ABSTRACT

Epoxide compounds can be cured without resorting to the usual elevated temperatures by reducing the ambient pressure to 4.79 Pa or lower. This is particularly useful in potting circuitry.

2 Claims, 1 Drawing Figure

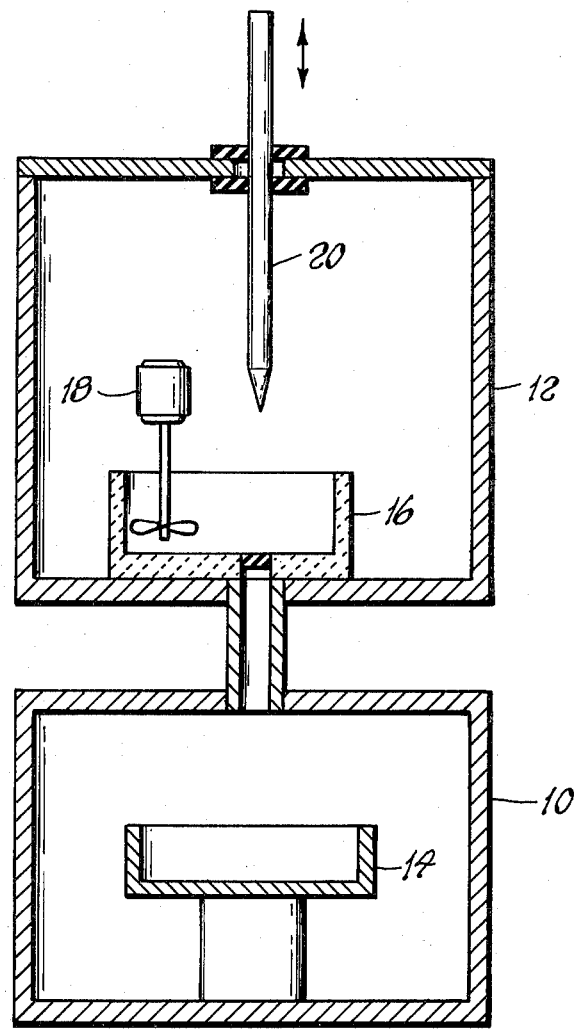

CURE OF EPOXY SYSTEMS AT REDUCED PRESSURES

BACKGROUND OF THE INVENTION

This invention relates generally to epoxide compounds and more particularly to the curing of such compounds.

Epoxide compounds have been found to be useful for encapsulating or potting electronic circuitry. This involves pouring the liquid components over the circuitry and then curing or polymerizing the liquid to a solid polymer.

In the prior art process, the electronic circuitry is typically heated to about 65° C. (150° F.) while evacuated for an extended time such as overnight to avoid any subsequent voids in the encapsulant. The liquid resin is then also heated to the same temperature and evacuated for 10–15 minutes after which it is poured into the mold containing the circuitry. (There are commercially available devices having separate chambers which can be independently evacuated and heated with a provision for pouring when desired from the upper chamber.) The mold is then removed and placed in an oven where it is gradually heated to 104° C. (220° F.). After 16 hours, the mold is removed and cooled to room temperature. The potted circuitry is then ready for use.

The foregoing prior art process, while achieving a useful potting compound, involves temperature changes which may result in harmful residual stresses because of the different coefficients of thermal expansion of the electronic circuitry and the resin.

SUMMARY OF THE INVENTION

Epoxide compounds are cured after mixing by reducing the pressure to which the compound is exposed to 4.79 Pa or lower during the curing. The reduced pressure avoids the necessity of using an elevated temperature for curing which avoids residual stresses when the compounds are used for potting.

BRIEF DESCRIPTION OF THE DRAWINGS

The drawing illustrates schematically, apparatus suitable for practicing the invention.

DESCRIPTION OF THE PREFERRED EMBODIMENT

Referring to the FIGURE, lower chamber 10 and upper chamber 12 can be independently evacuated and heated. Mold 14 for containing the electronic circuitry is positioned in lower chamber 10 while the liquid encapsulating material is placed in container 16 in upper chamber 12. Mixer 18 is provided for mixing the encapsulating material while it is at the desired pressure and temperature. Pointed shaft 20 is mounted in upper chamber 12 so that it may be lowered and raised to perforate the bottom of container 16 and permit its contents to pour into mold 14 in lower chamber 10.

In accordance with the invention, the electronic circuitry is placed in mold 14 and chamber 10 is evacuated to a pressure of at least $4.99 \times 10^3$ Pa (30 inches of water) at a temperature of 40° C. (104° F.) or higher to remove any residual gas. These conditions are maintained for several hours and then the pressure is lowered to $4.79 \times 10^3$ Pa. Next, the resin formulation is compounded and mixed in the normal manner, and is then poured into container 16. Chamber 12 is then evacuated to a pressure of $4.99 \times 10^3$ Pa, and maintained at a temperature of at least 40° C. but no higher than 65° C. (150° F.) mixer 18 is operated. After 10 to 15 minutes the pressure is further reduced to 4.79 Pa or lower and then shaft 20 is lowered and raised to permit the liquid encapsulating material to pour into mold 14 while maintaining the vacuum and temperature. These conditions are maintained overnight or for a similar period.

The potting compound used in both the prior art process and this invention is an epoxide compound, flexibilized with dimer acids and catalyzed with a heavy metal soap. One such compound is stannous octoate. The process can also be applied to an epoxide compound which has been catalyzed with an amide.

Although a particular embodiment of a method of curing epoxide compounds has been illustrated and described, it will be obvious that changes and modifications can be made without departing from the spirit of the invention or the scope of the appended claims.

We claim:

1. A method of curing epoxide compounds from the group consisting of those which have been flexibilized with dimer acids and catalyzed with a heavy metal soap, and those which have been catalyzed with an amide comprising:
   placing the mixed compound in a container;
   reducing the ambient pressure to at least $4.99 \times 10^3$ Pa while maintaining the ambient temperature at least 40° C. but no higher than 65° C. while mixing the compound;
   depositing said compound about circuitry; and
   after at least 10 minutes, further reducing the ambient pressure to 4.79 Pa or lower and maintaining these conditions until the compound is cured.

2. A method of curing epoxide compounds used as encapsulants for fragile structures, said epoxide compounds from the group consisting of those which have been flexibilized with dimer acids and catalyzed with a heavy metal soap, and those which have been catalyzed with an amide comprising:
   placing the mixed compound in a container;
   reducing the ambient pressure to at least $4.99 \times 10^3$ Pa while maintaining the ambient temperature at least 40° C. but no higher than 65° C. while mixing the compound;
   pouring the mixed compound into a mold containing the part to be encapsulated while maintaining the vacuum and temperature; and
   after at least 10 minutes, further reducing the ambient pressure to 4.79 Pa or lower and maintaining these conditions until the compound is cured.

* * * * *